US 6,793,190 B2

(12) United States Patent
White et al.

(10) Patent No.: US 6,793,190 B2
(45) Date of Patent: Sep. 21, 2004

(54) RETAINER CLIP FOR MOUNTING SINK TO COUNTERTOP

(75) Inventors: Donald E. White, Elmhurst, IL (US); Geraldine A. Domrose, Westmont, IL (US); Stephen J. Doyle, Downers Grove, IL (US); Daniel Erickson, Oak Park, IL (US); Paul Randolph Payne, LaGrange, IL (US); Peter Wozniczka, Des Plaines, IL (US)

(73) Assignee: Elkay Manufacturing Company, Oak Brook, IL (US)

( * ) Notice: Subject to any disclaimer, the term of this patent is extended or adjusted under 35 U.S.C. 154(b) by 0 days.

(21) Appl. No.: 10/045,572

(22) Filed: Oct. 23, 2001

(65) Prior Publication Data

US 2003/0075665 A1 Apr. 24, 2003

(51) Int. Cl.[7] ............................. A47B 97/00; E03C 1/33; B25G 3/36
(52) U.S. Cl. ............................. 248/500; 4/633; 403/397
(58) Field of Search ................................. 248/500, 510, 248/212, 205.1, 201, 200.1; 4/633, 634, 636, 616; 403/397, 329

(56) References Cited

U.S. PATENT DOCUMENTS

| | | |
|---|---|---|
| 2,584,581 A | 2/1952 | Harris |
| 2,584,860 A | 2/1952 | Galley |
| 2,672,621 A | 3/1954 | Drain |
| 2,679,052 A | 5/1954 | Walsh |
| 2,680,250 A | 6/1954 | Kerby |
| 2,752,609 A | 7/1956 | Phelps |
| 2,778,032 A | 1/1957 | Meehan |
| 2,818,579 A | 1/1958 | Katz |
| 2,864,099 A | 12/1958 | Strahs |
| 2,868,604 A | 1/1959 | Gibson et al. |
| 2,883,677 A | 4/1959 | Geen |
| 2,885,691 A | 5/1959 | Juergens |
| 2,897,516 A * | 8/1959 | Ensch .......................... 4/636 |
| 2,932,036 A | 4/1960 | Harris |
| 2,938,218 A | 5/1960 | Stone |

(List continued on next page.)

FOREIGN PATENT DOCUMENTS

| | | |
|---|---|---|
| AT | 393 075 B | 8/1991 |
| DE | 25 33 583 | 2/1976 |
| DE | 31 10 134 A1 | 10/1982 |
| DE | 34 10 103 A1 | 10/1985 |
| DE | 198 34 370 C1 | 9/1999 |
| DE | 100 07 550 A1 | 9/2000 |
| EP | 0 089 323 A1 | 9/1983 |
| EP | 0 709 528 A2 | 5/1996 |
| FR | 2 396 840 | 3/1979 |
| JP | 7 229188 | 8/1995 |

Primary Examiner—Leslie A. Braun
Assistant Examiner—Tan Le
(74) Attorney, Agent, or Firm—Leydig, Voit & Mayer, Ltd.

(57) ABSTRACT

A retainer clip includes a ratchet plate and a cooperating pawl for anchoring a sink to a countertop with a press-in, above-counter installation. The ratchet plate has a plurality of detents and is affixed to an edge of a cutout in the countertop. The pawl includes a spring element mountable to the sink and has at least one upwardly angled, resilient tab which successively engages the ratchet plate detents with a one-way action as the sink moves downwardly in the cutout. When the sink is fully inserted, the tab seats upwardly in a detent of the ratchet plate. In an embodiment, the pawl includes multiple tabs having slightly different lengths to provide an installation tolerance that is less than an incremental distance between ratchet plate detents.

26 Claims, 7 Drawing Sheets

U.S. PATENT DOCUMENTS

| | | | |
|---|---|---|---|
| 2,992,436 A | | 7/1961 | Camp |
| 2,993,088 A | * | 7/1961 | Camp .......................... 4/619 |
| 3,008,150 A | | 11/1961 | Lyon, Jr. et al. |
| 3,013,851 A | | 12/1961 | Maron |
| 3,022,519 A | | 2/1962 | Lang |
| 3,029,445 A | | 4/1962 | Just |
| 3,029,446 A | | 4/1962 | Just |
| 3,034,141 A | | 5/1962 | Lyon |
| 3,034,142 A | | 5/1962 | Lyon |
| 3,034,143 A | | 5/1962 | Lyon |
| 3,034,144 A | | 5/1962 | Lyon |
| 3,034,145 A | | 5/1962 | Lyon |
| 3,034,146 A | | 5/1962 | Lyon |
| 3,034,147 A | | 5/1962 | Lyon |
| 3,034,148 A | | 5/1962 | Lyon |
| 3,034,149 A | | 5/1962 | Lyon |
| 3,034,150 A | | 5/1962 | Lyon |
| 3,056,971 A | | 10/1962 | Hornik |
| 3,071,780 A | | 1/1963 | Lyon, Jr. |
| 3,080,569 A | * | 3/1963 | Juergens ....................... 4/636 |
| 3,095,580 A | | 7/1963 | Just |
| 3,110,040 A | | 11/1963 | Richardson |
| 3,126,552 A | | 3/1964 | Scharmer |
| 3,143,743 A | | 8/1964 | Just |
| 3,210,776 A | | 10/1965 | Cox |
| 3,229,310 A | * | 1/1966 | Ensch .......................... 4/616 |
| 3,231,903 A | | 2/1966 | Cope |
| 3,354,474 A | | 11/1967 | Cairus et al. |
| 3,386,108 A | | 6/1968 | Juergens |
| 3,583,002 A | * | 6/1971 | Roberts ........................ 4/636 |
| 3,585,657 A | | 6/1971 | Jensen et al. |
| 3,680,152 A | | 8/1972 | Farrell |
| 3,711,173 A | | 1/1973 | Hoffman |
| 3,813,707 A | | 6/1974 | Fowell |
| 3,982,287 A | * | 9/1976 | Miller .......................... 4/636 |
| 4,016,608 A | | 4/1977 | Khan |
| 4,041,964 A | | 8/1977 | Shamoon |
| 4,504,986 A | | 3/1985 | Vigh |
| 4,538,340 A | | 9/1985 | Ricke |
| 4,613,995 A | | 9/1986 | Ricke |
| 5,375,272 A | | 12/1994 | Mikol |
| 5,653,550 A | | 8/1997 | Mutz et al. |
| 5,664,265 A | | 9/1997 | Götter et al. |
| 5,842,240 A | | 12/1998 | Kato et al. |
| 5,903,936 A | | 5/1999 | Kato |
| 6,216,992 B1 | * | 4/2001 | Bisonaya et al. ........... 248/201 |

* cited by examiner

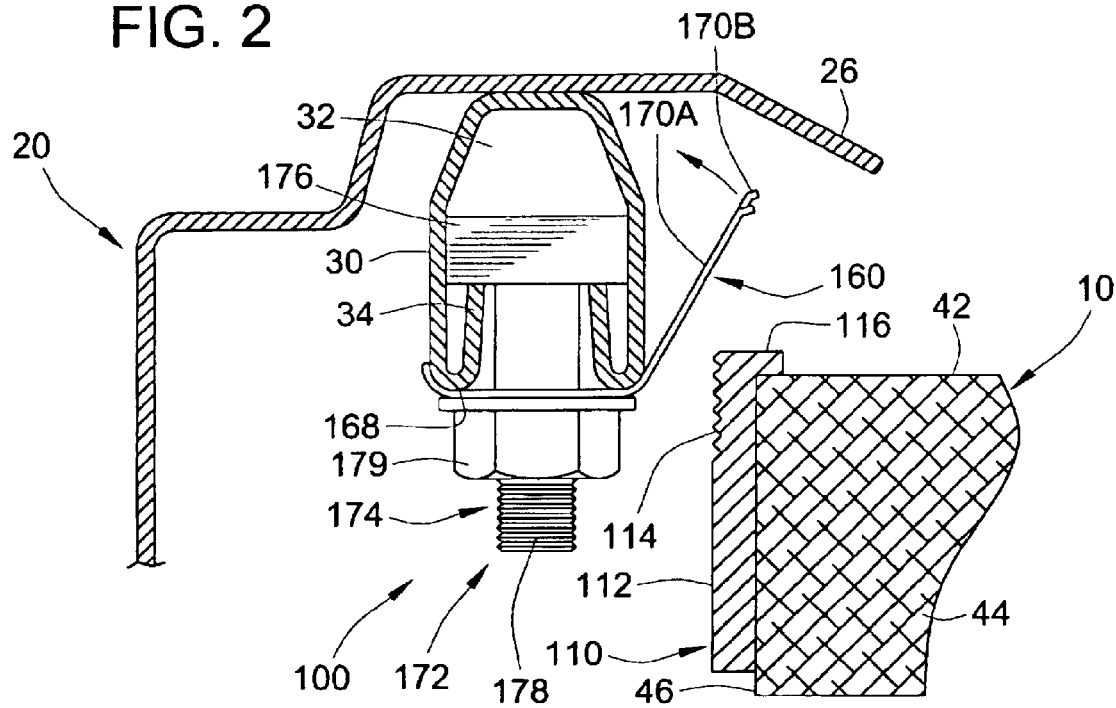
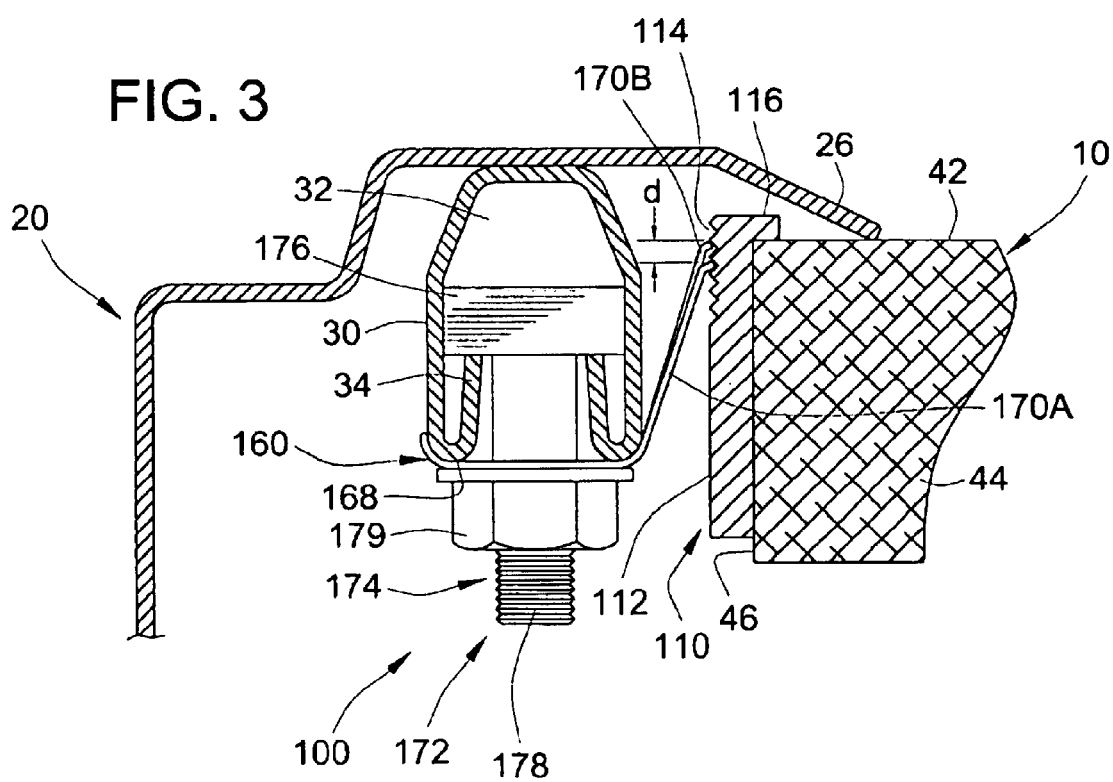

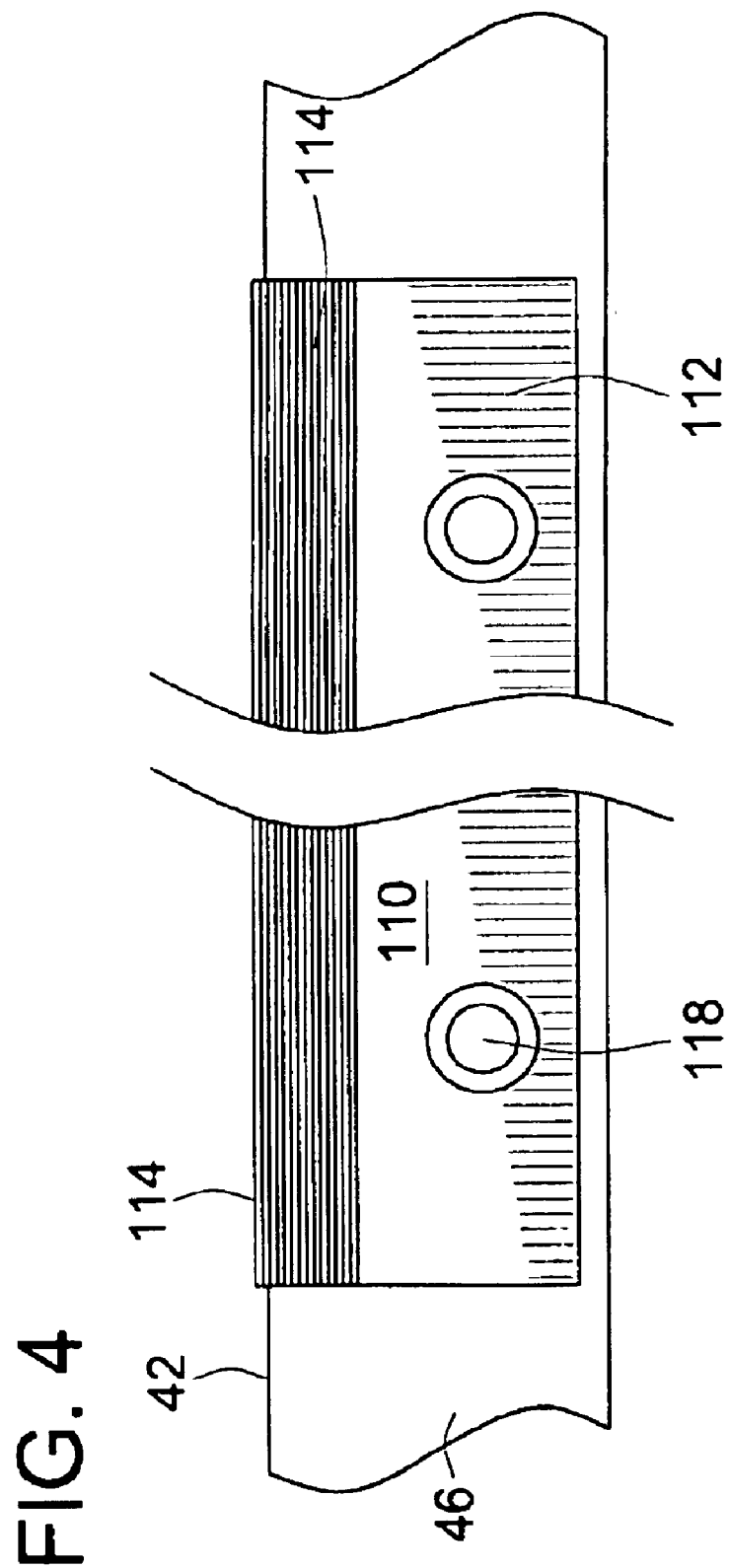

RETAINER CLIP FOR MOUNTING SINK TO COUNTERTOP

FIELD OF USE

The present invention generally relates to appliance retainer brackets and more particularly to a retainer structure for anchoring a sink to a countertop.

BACKGROUND OF THE INVENTION

In kitchens, bathrooms, and other facilities, a flanged washbasin or sink is typically mounted to a countertop. More particularly, the sink is positioned within a cutout in the countertop so that a peripheral flange at an upper portion of the sink seats against an upper surface of the countertop. The sink is conventionally anchored to the countertop using brackets which require an installer to access the bracket from below the sink. Such an installation can be awkward or difficult, as an installer must lie beneath the sink and reach overhead to secure the bracket, most often in poor lighting conditions. Many such brackets require special tools and include elements that must be tightened with screws. An installer must be familiar with the assembly of such multiple components to accomplish the overhead installation process. Conventional installation systems present a risk of forming a dimple in the sink rim if over-tightened.

In construction and renovation, it is desirable to facilitate the mounting of a sink in a quick and simple manner. For example, it is desirable to reduce the labor time required to install a sink unit. Especially in construction or renovation projects involving the installation of multiple sink units, such as in hotels and apartments, an efficient mounting system can result in significant cumulative labor savings. It is further desirable to provide a sink retainer clip that requires minimal training or skills.

In order to simplify the installation process, it is desirable to provide a mounting bracket that facilitates the installation of a sink from above the countertop, avoiding a need to access the mounting hardware from beneath the sink during installation. It is also desirable to provide such a mounting bracket which can be easily released, if necessary, to remove or adjust the sink. Certain snap-in structures have been developed in an attempt to provide an above-counter sink installation such as those disclosed in, for example, U.S. Pat. Nos. 3,143,743, 3,680,152 and 4,504,986. However, a need exists for an improved retainer structure that enables above-counter installation, has few parts, and provides secure anchoring. Additionally, a need exists for a secure retainer structure which is forgiving to variations in alignment and which avoids a need to install components at close tolerances. A further need exists for a retainer structure that avoids the risk of forming dimples in the sink rim.

Stainless steel sinks can be formed by a drawing process, which may result in a "cambered" shape such that a center of the sink bows slightly upwardly relative to the flanged edge. A need further exists for a retainer structure that utilizes a bias from the sink camber to enhance the anchoring force.

SUMMARY OF THE INVENTION

The present invention provides an improved retainer structure for securing a flanged sink to a countertop. In an exemplary embodiment, the invention provides a retainer clip which includes a ratchet plate adapted to be fixed to an edge of a cutout in the countertop and a corresponding pawl mountable to the sink. The cutout is shaped to receive the sink. The ratchet plate has a plurality of detents positioned vertically adjacent to each other, and the pawl is configured to lockably engage the detents with a one-way action. Specifically, the pawl has at least one resilient tab capable of deflectably engaging successive detents of the ratchet plate when the sink is inserted downwardly into the countertop, the tab incrementally repositioning in the successive detents. When the sink has been fully inserted, the tab complementarily seats upwardly in the detent at that position to retain the sink in the fully inserted position.

In a sink installation, it is intended that a plurality of ratchet plates and associated pawls will be implemented to anchor the sink at multiple points around its periphery.

The pawl can be provided in various adaptations to be used with particular sink designs. For example, in an embodiment, the pawl has a base portion configured for mounting within a U-shaped channel rail that extends from an underside of the flange of the sink. In another adaptation, the pawl is mounted to a planar bracket extension of a sink, such as an offset shaped rail. Accordingly, an advantage of the present invention is that it provides a retainer clip that can be used with a variety of sink types.

To provide secure seating of the pawl against positions of the ratchet plate with greater precision than the incremental distance between detents, according to an embodiment of the invention, the pawl includes multiple resilient tabs, the tabs having different lengths. Preferably, the difference in dimension among the tabs is less than an incremental distance between the detents. In an embodiment, the pawl is a unitary spring element.

An advantage of the present invention is that it provides a retainer clip that enables an above-countertop installation of a flanged sink. A related advantage is that it provides a structure for securely mounting a flanged sink to a countertop with a downward insertion motion. Thus, the invention advantageously provides a system for mounting a sink to a countertop in a simple and time-efficient manner.

Yet another advantage of the present invention is that it provides a sink retainer clip that is forgiving to variations in tolerance. Also, the present invention advantageously provides a sink retainer clip that exerts an enhanced securing force as a result of a natural camber of the sink.

A further advantage of the present invention is that it provides a sink retainer structure that permits removal and reinstallation without damaging the sink.

Additional features and advantages of the present invention are described in, and will be apparent from, the following detailed description when read in conjunction with the appended drawings.

BRIEF DESCRIPTION OF THE DRAWINGS

FIG. 2 is a fragmentary, sectional view of a countertop and sink in an uninstalled condition, an arrow indicating a direction of installation insertion, and a retainer clip including a pawl secured to a sink channel rail and a ratchet plate mounted to an edge of the counter.

FIG. 3 is an fragmentary, sectional view taken generally along line III—III of FIG. 1, illustrating the components of FIG. 2 in an installed condition.

FIG. 4 is a fragmentary elevation of the ratchet plate of FIGS. 2 and 3.

DETAILED DESCRIPTION OF THE DRAWINGS

Figure 1:
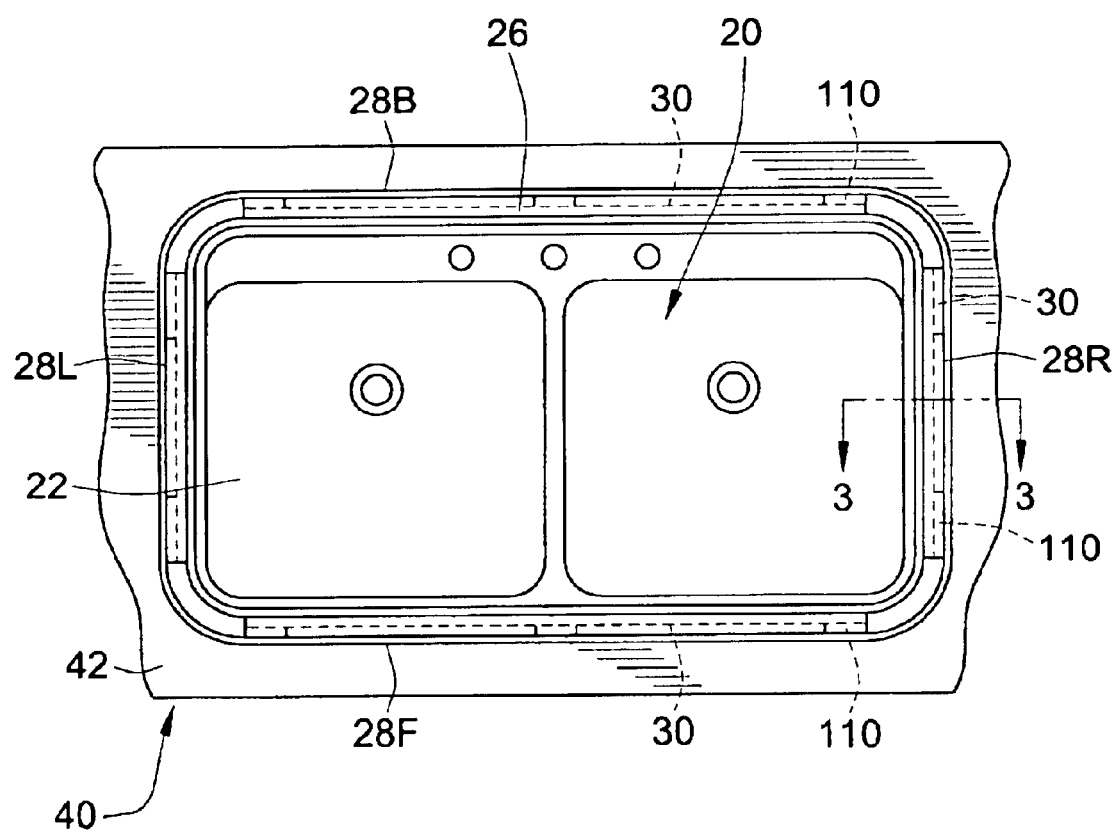
FIG. 1 is a fragmentary plan view of a countertop having a sink mounted therein using a retainer clip constructed in accordance with an embodiment of the invention.

Now referring to the drawings, wherein like numerals designate like components, FIG. 1 shows the general environment in which the invention is used, illustrating a sink 20 mounted to a countertop 40. The sink 20 includes at least one bowl or basin portion 22 having a drain 24 at a bottom thereof and a peripheral flange or rim 26 that extends in a generally outward direction at an upper portion of the sink 20. The sink 20 resides within a cutout in the countertop 40 so that the flange 26 seats against an upper surface 42 of the countertop 40. The countertop 40 is of a generally known type having a body 44 (FIGS. 2, 3 and 9) that is typically made of wood or a composite material.

To securely anchor the sink to the countertop, the present invention provides a retainer structure that permits a press-in installation of the sink into the cutout of the countertop and holds the sink in a fully inserted position wherein the sink flange seats on the upper surface of the counter. More particularly, referring to FIGS. 2 and 3, a retainer clip 100 is provided which includes a ratchet plate 110 to be fixed to an edge 46 of the cutout in the countertop 40 and a corresponding pawl 160 mountable to the sink 20. The ratchet plate 110 is generally planar and has a front face 112 with a plurality of detents 114 recessed therein. In the embodiment illustrated in FIGS. 2 and 3, each of the detents is a V-shaped groove formed by two surfaces disposed at generally right angles relative to each other. Referring to FIG. 4, it is seen that each of the detents 114 extends generally horizontally across the front face 112, and the detents 114 are positioned parallel and vertically adjacent to each other.

The ratchet plate 110 of FIG. 4 has a length suitable for a desired application. For example, in an embodiment, the ratchet plate 110 may have a length which spans a significant distance along an edge 46 of the cutout. Only one such plate 110 is attached to the edge 46. Such an embodiment is advantageous because it can be easily installed without a need for precise placement, yet accommodating engagement by multiple pawls 160. In another embodiment, the ratchet plate 110 is shorter, and multiple ratchet plates 100 are mounted spaced from each other along the same edge 46, each of the plates 110 accommodating a correspondingly positioned pawl 160.

The sink 20 illustrated in FIG. 1 is generally rectilinear, having a front, rear, left and right sides, 28F, 28B, 28L, and 28R, respectively. A plurality of the ratchet plates 110 are mounted to the countertop 40 around the various sides of the sink 20. It should be further noted that the illustrated ratchet plate 110 shown is adapted to fit against an edge of a cutout having straight sides for receiving the rectangular sink 20 of FIG. 1, but the ratchet plate could be shaped to have a slight curvature as needed to fit against a correspondingly shaped cutout, such as a circular or oval cutout.

To aid in properly positioning the ratchet plate 110 relative to the countertop 40, a stop 116 extends rearwardly from an upper edge of the ratchet plate 110, as shown in FIGS. 2 and 3. The stop 116 is configured to seat against the upper surface 42 of the countertop 40. A plurality of holes 118 are provided in the ratchet plate 110 for mounting the ratchet plate to the countertop.

Figure 5:
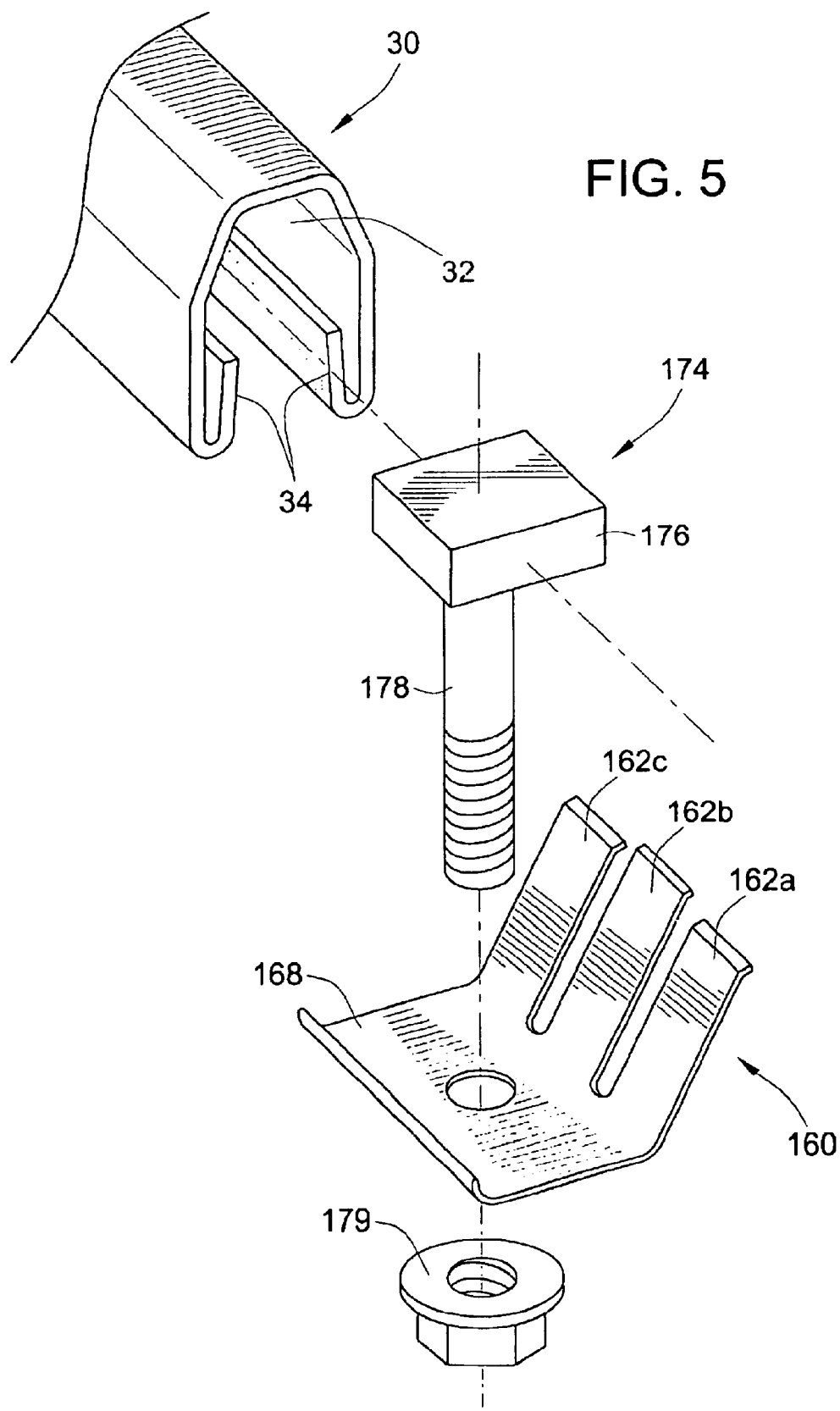
FIG. 5 is a exploded, perspective view of the channel rail and pawl components of FIGS. 2 and 3.

The pawl 160 is mountable to the sink 20, as shown in FIGS. 2 and 3. Conventional sinks have generally included a bracket projection in the vicinity under the sink flange to accommodate mounting of the sink to the countertop. Those skilled in the art will recognize that the pawl 160 of the invention may be, for example, adapted for use with a sink having a conventional bracket projection or rail, such as a channel rail 30 as illustrated in FIGS. 2, 3 and 5. The channel rail 30 is attached to an underside of the peripheral flange 26, such as by welding. The rail 30 has a generally U-shaped cross section, defining an interior cavity 32 which opens downwardly. Along a bottom edge of the interior cavity, the rail 30 has a pair of opposed upwardly curved ridges 34.

The pawl 160 comprises a spring element having at least one resilient tab 162A-C. The pawl 160 is illustrated in greater detail in FIGS. 7 and 8. The pawl 160 is preferably unitary and may be constructed of spring steel or some other material of suitable strength and stiffness. In one embodiment, the pawl is formed from a planar blank 164, shown in FIG. 6, which is cut to the desired shape, including slots 166 between respective tabs 162A-C. The blank is then bent to form the pawl 160.

Figure 6:
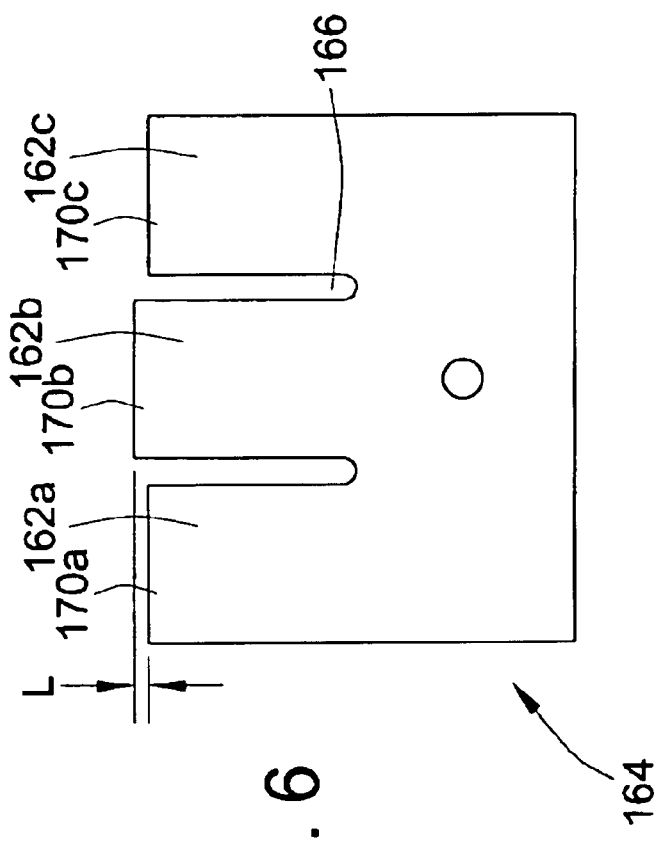
FIG. 6 is a plan view of a blank from which the pawl of FIGS. 2, 3 and 5 is formed.
Figure 7:
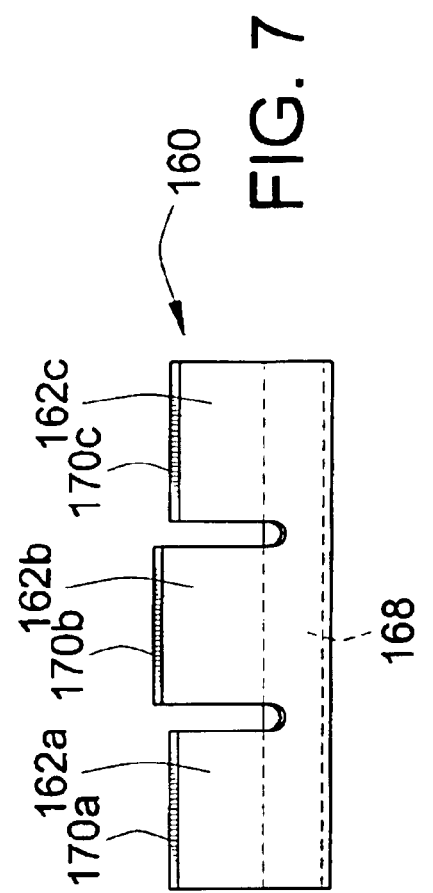
FIG. 7 is an elevation of the pawl illustrated in FIGS. 2, 3 and 5 and formed from the blank of FIG. 6.
Figure 8:
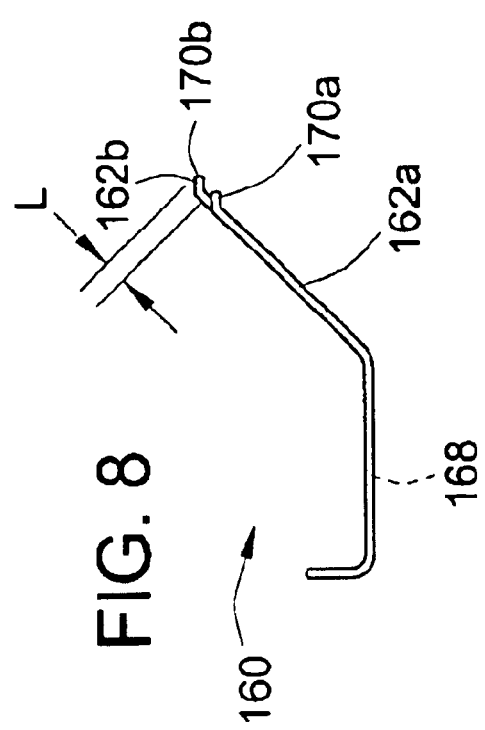
FIG. 8 is an end elevation of the pawl of FIG. 7.

More particularly, referring to FIGS. 6–8, the pawl 160 generally includes a base portion 168 and the resilient tabs 162A-C which project from the base portion. Slots 166 define separations between adjacent tabs, and at least one hole is provided through the base portion. Each of the resilient tabs 162A-C projects from the base portion 168 at an upwardly oblique angle in a direction generally outwardly from the sink 20 (FIGS. 2 and 3). Each of the resilient tabs 162A-C has a tip 170A opposite the base portion 168 which is shaped to complementarily seat in any one of the detents 114 of the ratchet plate 110 (FIGS. 2 and 3). Each of the tips 170A-C may have a slight bend to engage the detent 114 at an optimal locking orientation.

In the embodiment illustrated in FIGS. 2 and 3, a mount assembly 172 is provided to fixedly secure the base portion 168 of the pawl 160 relative to the generally U-shaped channel rail 30 under the sink flange 26. The mount assembly 172 includes a screw 174 having a head 176 shaped to be received within the interior cavity of the channel rail. The head 176 is configured to prevent rotation of the screw within the confines of the interior cavity 32. For example, the head 176 may be square, parallelogram-shaped, football shaped (as illustrated), etc. Additionally, the head 176 seats downwardly against the pair of opposed ridges 34, thereby fixing the screw within the channel rail 30. To secure the pawl 160, the screw 174 has a threaded portion 178 that projects between the ridges 34 and outwardly from the interior cavity 32 and through the base portion 168 of the pawl 160. The mount assembly 172 includes a nut 179 which secures the base portion 168 of the pawl 160 in an upwardly direction firmly against the channel rail 30.

Figure 9:
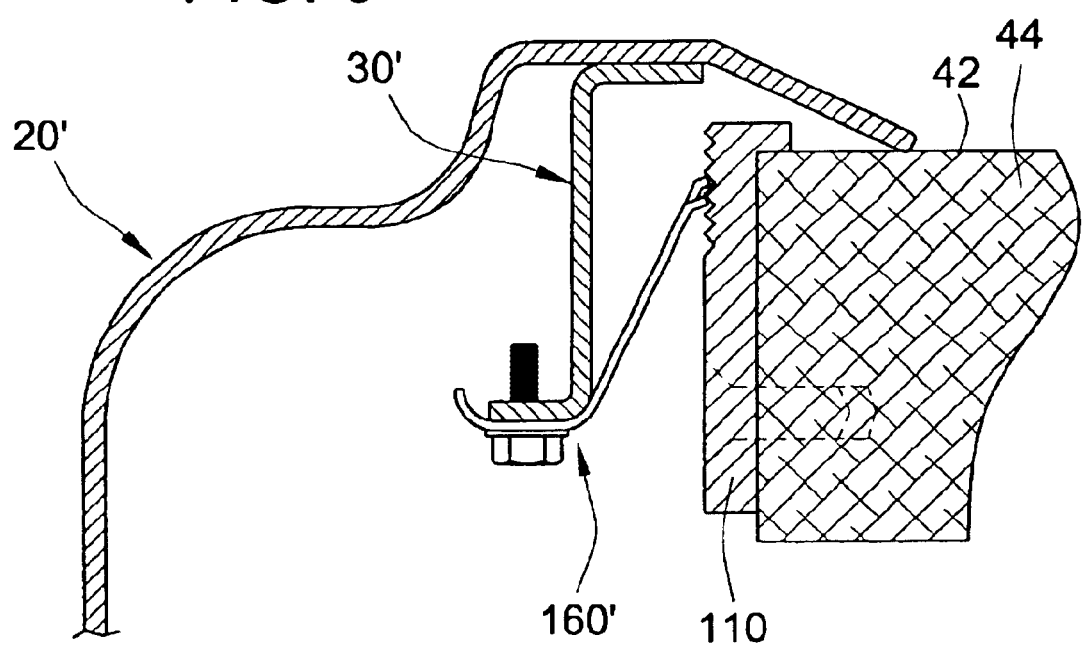
FIG. 9 is a fragmentary, sectional view of a flanged sink installed and anchored to a countertop with a pawl according to an alternative embodiment of the invention, the pawl being mounted to an offset rail extending from the sink flange.
Figure 10:
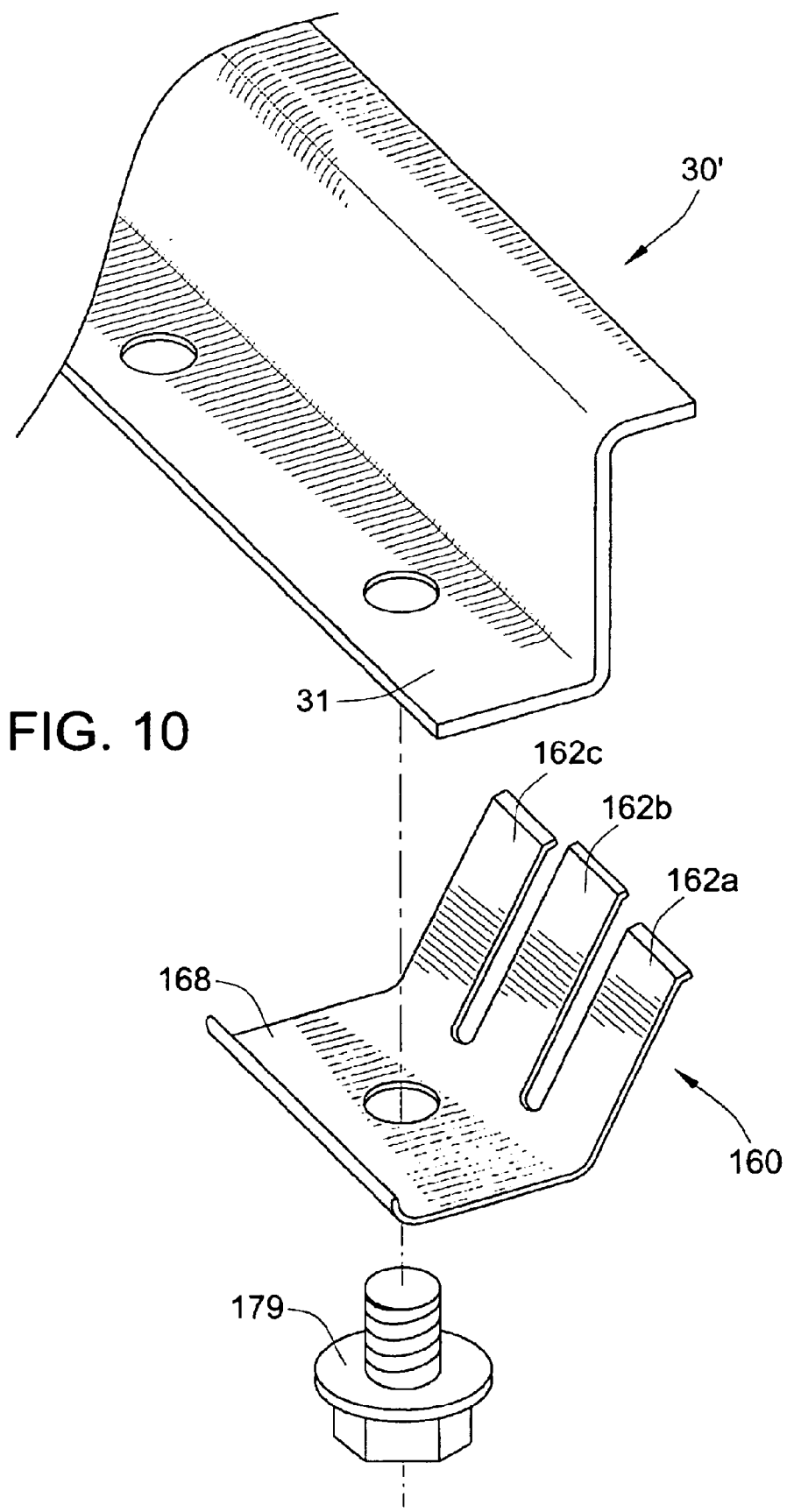
FIG. 10 is an exploded perspective view of the offset rail and pawl of FIG. 9.

As mentioned, the retainer clip 100 of the invention may be adapted for use with various sink designs. To demonstrate, FIG. 9 illustrates an alternative embodiment wherein a pawl 160' is mounted to a sink 20' having a rail 30' with a generally Z-shaped configuration, the rail 30' being attached to an underside of flange 26' of sink 20' and extending downwardly to a planar mounting portion 31. The rail 30' is illustrated in isolation in FIG. 10 for a greater understanding. The base portion 168 of the pawl 160 is secured to the mounting portion via mount assembly, such as with a screw 177.

Referring back to FIGS. 2 and 3, the installation of the sink 20 will be described. An installer can mount the ratchet plate 110 within the cutout from above the countertop 40. The sink 20 is then lowered so that the basin portion 22 of the sink 20 is inserted through the cutout in the direction of the arrow A, illustrated in FIG. 2, with the pawl 160 and ratchet face 110 being in generally corresponding alignment. The ratchet plate 110 can be substantially wider than the pawl 160 so that precise alignment during installation is not required. As shown in FIG. 3, the sink 20 is inserted until the flange 26 seats against the upper surface 42 of the countertop 40. During a final distance of insertion, the resilient tabs 162A–C of the pawl 160 deflectably engage successive detents 114 of the ratchet plate 110. In a fully inserted position as shown in FIG. 3, at least one of the resilient tabs 162A–C seats upwardly in one of the detents 114 applying a downward locking force to retain the sink 20 securely against the countertop 40. The pawl 160' of FIG. 9 operates in a similar manner.

The anchoring force of the resilient tab 162A–C against the detent 114 of the ratchet plate 110 is enhanced and maintained by a resilient bias of the sink 20 against the counter 40. Specifically, when the sink 20 is firmly pressed in to its fully inserted position, seating force against the upper surface 42 if the countertop 40 causes the flange to deflect slightly, with a resulting bias force urging the pawl 160 upwardly against the ratchet plate 110. Additionally, pressing the sink 20 downward during the installation acts to flatten the natural camber shape (not illustrated) which the sink 20 may have, as explained above in the background. The bias of the sink 20 to return to the cambered shape, also urges the pawl 160 upwardly against the ratchet plate 110.

If it is desired to remove the sink 20, the screws 177 may be removed, permitting the pawls 160 to disengage from the respective ratchet plates 110 and to drop away from the nails 30'. The sink 20 is then free to be lifted away from the countertop 40.

To enhance the closeness of fit of the installed sink 20 relative to the counter 40, each of the multiple resilient tabs 162A–C preferably has slightly different length (l) (FIGS. 6 and 8). The difference in length (l) among tabs is selected such that when the tabs contact against the ratchet face, the difference in vertical dimension (d) among tabs 162A–C is less than an incremental distance between adjacent detents 114 in the ratchet plate 110, as illustrated in FIGS. 2 and 3. This ensures that one of the tabs 162A–C will seat in one of the detents within a much smaller insertion distance than the detent increment.

While the invention is described herein in connection with certain preferred embodiments, the invention is not limited it to those embodiments. On the contrary, it is recognized that various changes and modifications to the described embodiments will be apparent to those skilled in the art, and that such changes and modifications may be made without departing from the spirit and scope of the present invention. Accordingly, the intent is to cover all alternatives, modifications, and equivalents included within the spirit and scope of the invention as defined by the appended claims.

What is claimed is:

1. A retainer clip for mounting a flanged sink to a countertop in which the flange seats against the countertop, the retainer clip comprising:
   a ratchet plate mounted to an edge of the countertop, the ratchet plate including a front face sinkwardly directed and having a plurality of detents, each of the detents including a generally horizontal groove on the front face of the ratchet plate, the detents being aligned parallel to each other; and
   a pawl mounted to the sink and configured to deflectably engage at least one of the detents of the ratchet plate when the sink is inserted downwardly into the countertop and to upwardly seat in said one of the detents to retain the sink in a fully inserted position.

2. The retainer clip of claim 1, wherein each of the detents is a generally V-shaped groove formed by two surfaces disposed at a generally right angle relative to each other.

3. The retainer clip of claim 1, wherein the ratchet plate includes a stop which extends rearwardly from an upper edge of the ratchet plate to seat against an upper surface of the countertop.

4. The retainer clip of to claim 1, wherein the pawl includes at least one resilient tab which deflectably engages the ratchet plate.

5. A retainer clip for mounting a flanged sink to a countertop in which the flange seats against the countertop, the retainer clip comprising:
   a ratchet plate mounted to an edge of the countertop, the ratchet plate including a front face sinkwardly directed and having a plurality of detents; and
   a pawl including a plurality of resilient tabs, at least some of the tabs having respectively different lengths, mounted to the sink and configured to deflectably engage at least one of the detents of the ratchet plate when the sink is inserted downwardly into the countertop and to upwardly seat in said one of the detents to retain the sink in a fully inserted position.

6. The retainer clip of claim 5, wherein a difference in vertical dimension among at least some of the tabs is less than an incremental vertical distance between adjacent detents in the ratchet plate.

7. The retainer clip of claim 5, wherein the pawl is a unitary spring element which includes at least one slot defining a separation between adjacent tabs.

8. The retainer clip of claim 5, wherein the pawl includes: a base portion which is securable relative to the sink; a body portion projecting from the base portion at an upwardly oblique angle in a direction generally outwardly from the sink; and a tip portion opposite the base end, the tip being shaped to complementarily seat in the detents.

9. The retainer clip of claim 8, further comprising a mount assembly adapted to fixedly secure the base portion of the resilient tab relative to a rail of the sink under the sink flange, wherein the mount assembly is adapted to be mounted to a rail extending along an underside of the sink flange, the mount assembly including at least one screw hole, the mount assembly including a screw adapted to extend through the screw hole to secure the base end of the resilient tab relative to the rail.

10. The retainer clip of claim 8, wherein the pawl includes a mount assembly adapted to fixedly secure the base portion of the pawl relative to a generally U-shaped channel rail of the sink under the sink flange, the mount assembly including at least one screw having a head shaped to be slidably received within an interior cavity of the channel rail, the screw having a threaded portion projecting outwardly from the interior cavity, the base end of the tab including a hole for receiving the threaded portion of the screw, the mount assembly further including a nut to secure the resilient tab relative to the rail.

11. The retainer clip of claim 10, wherein the screw head is shaped to prevent rotation of the screw relative to the channel rail.

12. A retainer clip for anchoring a flanged sink within a cutout of a countertop, the retainer clip comprising:
- a ratchet plate mounted to an edge the countertop within the cutout, the ratchet plate including a front face sinkwardly directed and having a plurality of parallel detents respectively spaced from each other by an incremental distance; and
- a pawl mounted to the sink, the pawl including a plurality of resilient tabs, each of the tabs configured to deflectably engage the ratchet plate and to engage successive detents with a one-way locking action as the pawl moves vertically relative to the ratchet plate;
- wherein at least some of the resilient tabs have different respective lengths so that when at least one of the tabs is seated upwardly in a detent, at least one of the other tabs is positioned between detent increments.

13. The retainer clip of claim 12, wherein each of the detents is a generally V-shaped groove formed by two surfaces disposed at a generally right angle relative to each other.

14. The retainer clip of claim 12, wherein the ratchet plates includes a stop which extends rearwardly from an upper edge of the ratchet plate to seat against an upper surface of the countertop.

15. The retainer clip of claim 12, wherein the pawl is unitary and includes: a base portion which is securable relative to the sink; a body portion projecting from the base portion at an upwardly oblique angle in a direction generally outwardly from the sink; and a tip portion opposite the base end, the tip being shaped to complementarily seat in the detents.

16. A combination comprising:
- a sink including a peripheral flange for seating against a countertop and a plurality of rails mounted to an underside of the peripheral flange; and
- a plurality of retainer clips for mounting the sink within a cutout of a countertop, each of the retainer clips including;
- a ratchet plate mountable to an edge of the cutout, the ratchet plate including a front face having a plurality of detents positioned vertically adjacent to each other, each of the detents including a generally horizontal groove on a front face of the ratchet plate, the detents being aligned parallel to each other; and
- a pawl mounted to the rail of the sink and including at least one resilient tab to deflectably engage successive detents of the ratchet plate when the sink is inserted downwardly into the cutout and to upwardly seat in one of the detents to retain the sink in a fully inserted position when the flange seats against the countertop.

17. The combination of claim 16, wherein each of the detents is a generally V-shaped grooved.

18. The combination of claim 16, wherein the ratchet plate includes a stop which extends rearwardly from an upper edge of the ratchet plate to seat against an upper surface of the countertop.

19. A combination comprising:
- a sink including a peripheral flange for seating against a countertop and a plurality of rails mounted to an underside of the peripheral flange; and
- a plurality of retainer clips for mounting the sink within a cutout of a countertop, each of the retainer clips including;
- a ratchet plate mountable to an edge of the cut out, the ratchet plate including a front face having a plurality of detents positioned vertically adjacent to each other; and
- a pawl mounted to the rail of the sink and including a plurality of resilient tabs, at least some of the tabs having respectively different lengths, to deflectably engage successive detents of the ratchet plate when the sink is inserted downwardly in to the cutout and to upwardly seat in one of the detents to retain the sink in a fully inserted position when the flange seats against the countertop.

20. The combination of claim 19, wherein a difference in vertical dimension among at least some of the tabs is less than an incremental vertical distance between adjacent detents in the ratchet plate.

21. The combination of claim 19, wherein the pawl is a unitary member and the plurality of tabs are formed by at least one slot defining a separation between adjacent tabs.

22. The combination of claim 21, wherein the pawl includes: a base portion which is fixed relative to the sink, a body portion projecting from the base portion at an upwardly oblique angle in a direction generally outwardly from the sink; and a tip portion opposite the base end, the tip being shaped to complementarily seat in the detents.

23. The combination of claim 22, wherein the sink includes a rail extending under the flange and further comprising at least one screw securing the base portion of the pawl to the rail.

24. The combination of claim 22, wherein the sink includes a generally U-shaped channel rail extending along an underside of the flange, further comprising at least one screw head disposed within an interior cavity of the channel rail, the screw having a threaded portion projecting outwardly from the interior cavity, a hole extending through the base portion of the pawl and a nut securing the resilient tab relative to the rail.

25. The combination of claim 24, wherein the screw head is shaped to prevent rotation of the screw relative to the channel rail.

26. The combination of claim 24, wherein the channel further includes a pair of opposed ridges which project inwardly along an opening to the interior cavity, the screw head seating against the ridges.

* * * * *